Nov. 1, 1927.
G. J. HARTNETT
1,647,447
METHOD OF FASTENING TUBULAR BODIES IN HOLES OF OTHER BODIES
Filed Dec. 28, 1922　　2 Sheets-Sheet 1
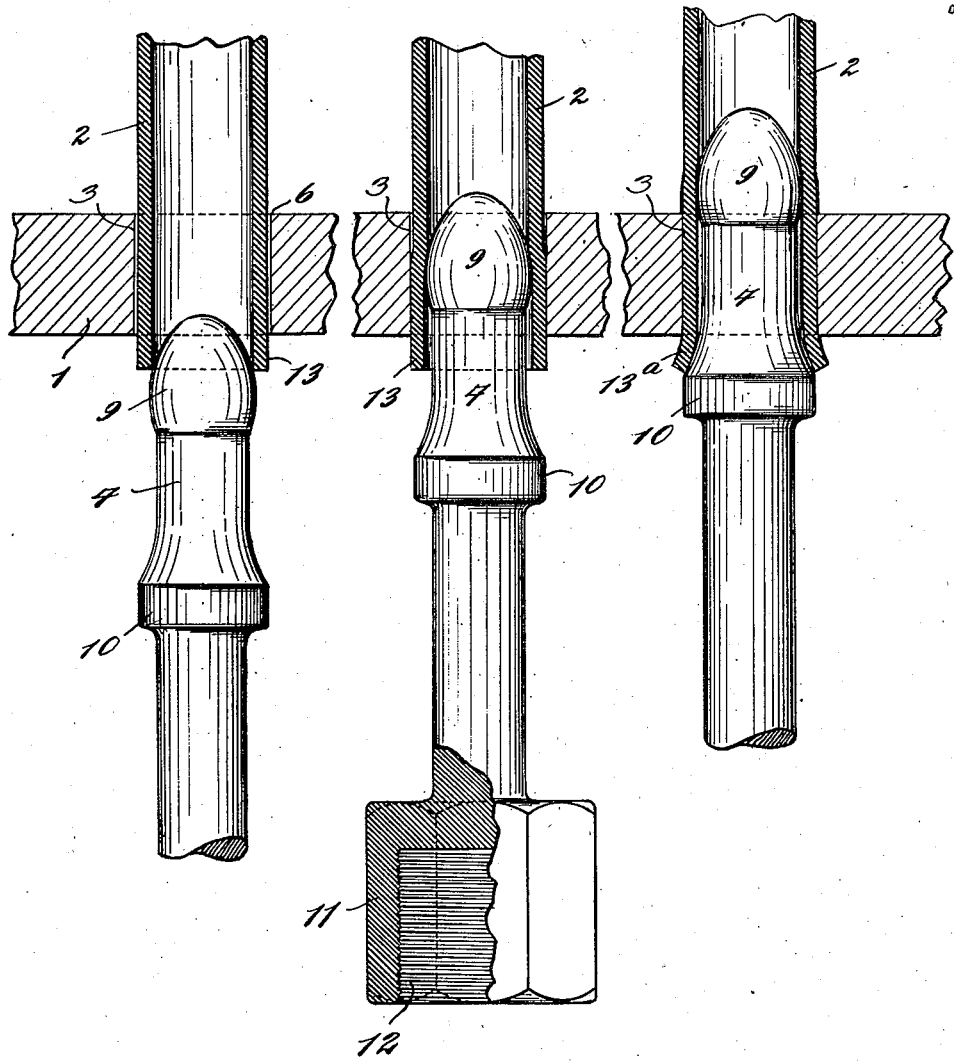
INVENTOR.
George J. Hartnett
BY
ATTORNEYS.

Nov. 1, 1927.
G. J. HARTNETT
1,647,447
METHOD OF FASTENING TUBULAR BODIES IN HOLES OF OTHER BODIES
Filed Dec. 28, 1922
2 Sheets-Sheet 2
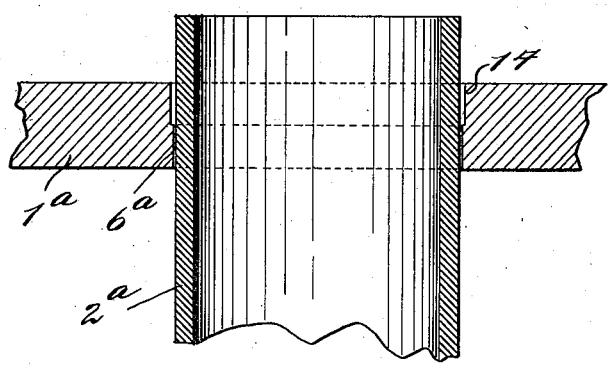
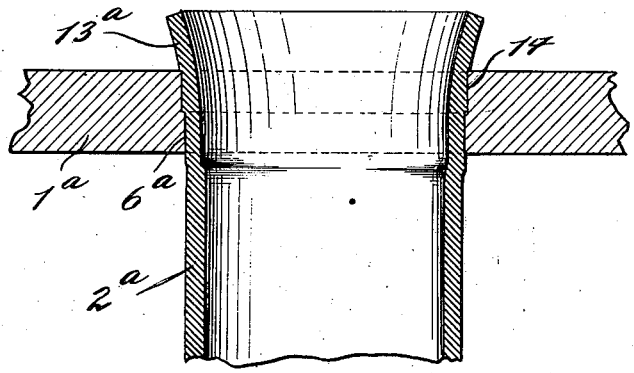
INVENTOR.
George J. Hartnett
BY
his ATTORNEYS.

Patented Nov. 1, 1927.

UNITED STATES PATENT OFFICE.

GEORGE J. HARTNETT, OF BAYONNE, NEW JERSEY, ASSIGNOR TO THE BABCOCK & WILCOX COMPANY, OF BAYONNE, NEW JERSEY, A CORPORATION OF NEW JERSEY.

METHOD OF FASTENING TUBULAR BODIES IN HOLES OF OTHER BODIES.

Application filed December 28, 1922. Serial No. 609,452.

My invention relates to a method of expanding a portion of a tubular body within a hole in another body, the said hole having a larger perimeter than the tubular body, for the purpose of fastening the said bodies together.

The object of this invention is to expand the said portion of the tubular body in such manner that the expanded portion will be of uniform thickness, thus effecting a contact between the entire outer surface of the tubular body and the inner wall of the hole. A further object is to obtain such result in a simple and practical manner, avoiding complicated parts, which in a device of this character are objectionable on account of the severe strain to which they are subjected.

In order that the advantages and novelty of my expanding method may be more readily understood, I will give a brief description of the three expanders now in use and commonly known as the "Prosser" expander, "roller" expander, and the "drift" expander.

The "Prosser" expander, which requires a conical mandrel within a system of wedge-shaped pieces is objectionable, particularly when used for expanding very small tubes, because of the fragility inherent in the many small parts which the construction requires.

The "roller" method has proven impractical in cases where the tubular body is small in cross-section and the portion to be expanded is relatively long. When used for such work, the parts of the expanding tool are very fragile and a uniform thinning of the expanded surface cannot be obtained for the reason that for good rolling action of the tapered mandrel and rolls the expanded portion of tube becomes thinner on its outer end and thicker at its inner end, or if the rolls are made of reversed taper to roll a cylindrical hole, then the mandrel will be twisted off before sufficient power can be developed to do the work.

In the "drift" expander a conical mandrel is used, which will just enter the tubular body and is driven therein. The same non-uniform thickness of the expanded portion is met within this method very much the same as in the "roller" expanding of a tubular body of small diameter.

My invention overcomes the disadvantages as found in expanders now in use and gives a uniform thinning of the expanded portion of a tubular body.

The invention will be understood by reference to the accompanying drawing, in which Figs. 1, 2, and 3 are sectional views, partially in side elevation, showing a tool for expanding the tube and also flaring the projecting end thereof, the three views showing the tool in different positions as the same is advanced within the tube; Fig. 4 is a sectional view showing a tube disposed within an opening of a tube sheet, the wall surrounding the opening being formed with a groove; and Fig. 5 is a view similar to Fig. 4 but showing the end of the tube expanded into the opening, the metal of the tube filling the groove.

Similar reference characters indicate similar parts in the various views.

Referring to the drawing, the numeral 1 designates a plate or body to which tubular bodies 2 are to be fastened in the holes 3 provided in said plate or body and 4 is a plunger for expanding the said tubular bodies.

The holes for receiving the tubular bodies have slightly larger perimeters than said bodies, to allow for the easy insertion of the tubular bodies before expansion. To effect such expansion the plunger is preferably enlarged in cross-section to give an annular protuberance at any desired point, as at 9, and forming upon the plunger what will hereinafter be termed a head, and which is here shown as generally oval in form, though it will be understood that the form is not limited to that here shown. The perimeter of the head is slightly larger than the perimeter of the normal interior of the tubular body.

When a tubular body is in position within a hole, which may be of any desired cross-sectional form, it is temporarily held in position by a clamp or other suitable means (not shown). The plunger is then driven forward or inward by any desired continuous or intermittent source of power or blows, as, for example, a hydraulic ram or hammer, thereby extending and slightly thinning the wall of the tubular body and fastening it within the hole or restraining wall 6 of another body, as shown in Fig. 2.

The plunger may be extracted by inserting a hook in the hole 7 provided in the plunger, or by any other method, such as pushing it back from the other end or by the action of a double-acting hydraulic or other power cylinder.

As the plunger moves into the tubular body, the said body is extended in length ahead of the movement of the plunger and the action is the same as the drawing of a tube on a mandrel.

When expanding tubes inserted in and projecting through holes of metal walls by the forward acting and expanding tool, as indicated in Fig. 1, the tendency of the metal is to flow forward and outward radially at the same time to expand the tube tightly within the hole of slightly larger diameter, while some lengthening of the tube takes place.

In the form of my invention shown, referring to Figs. 1, 2, and 3, the expanding tool 4 is provided with a second head 10 located at some distance from the head 9. The perimeter of the head 10 is greater than that of the head 9 and the working face of this head is generally conical in form, so that when the expanding tool is forced home to its final position, as indicated in Fig. 3, the head 10 engages the projecting end 13 of the tube and flares the same, as indicated at 13ª. In the form here shown, the working face of the head 10 is formed in such a way as to produce a bell-shaped opening in the end of the tube. The end of the tool here illustrated is provided with a socket 11 which is internally threaded, as at 12, to engage a suitable plunger or other member.

In Figs. 1 to 3 the wall surrounding the opening 6 in the member 1 is shown as cylindrical in form. In the form shown in Figs. 4 and 5, in which the same parts are designated by the same reference character except that the letter *a* is added, the wall surrounding the opening 6 is provided with a groove 14. The action of advancing the tool by means of successive blows, especially where the blows are so graduated that the tool advances progressively a short distance for each blow, will cause the groove 14 in the tube-plate into which the tube is expanded to be more thoroughly filled with material than where the tube is expanded in the usual way. The special form of the end of the tool which is forced into the interior of the tube produces a localized action opposite that part of the end of the tool which has the maximum diameter and this action causes the tool to be more effective in forcing the material into the groove than the usual forms of expanders where a comparatively long roller is employed and where there is no such localized action.

A novel feature of my invention lies in the fact that the action of my device is the reverse of that used in tube drawing, but the same uniform resultant wall is obtained. It is well known that in the art of tube drawing the mandrel is the male member and the drawing ring or die the female member. In my method the hole or restraining wall performs the same function as the mandrel, to give the perimeter desired, as in tube drawing, and the plunger performs the same operation as the drawing ring or die.

It is obvious that my method of expanding tubular bodies may be applicable to uses other than the fastening of one body to another—namely, it may be practiced to expand one end of a tubular body to such inside diameter as may be necessary to fit the outside diameter of a like tubular body, for the purpose of fitting or joining sections of such tubular bodies together.

I claim:—

1. The method of expanding and securing a tube end in a hole in a metal sheet by means of a tool provided with a peripherally continuous annular head of a diameter greater than the internal diameter of the tube and followed by a portion flaring outwardly to a diameter greater than that of the said head, the diameter of said hole being greater than the external diameter of the tube, which consists in holding the end of the tube in said hole, expanding the metal tube radially into said hole by progressively forcing the head into the portion of the tube enclosed within the hole, and then forcing said flaring portion of the tool into the extreme end of the tube thereby flaring it outwardly to a diameter greater than that of the hole.

2. The method of expanding and securing a metal tube end in a hole in a metal sheet by means of a tool provided with a peripherally continuous rounded head of a diameter greater than the internal diameter of the tube and followed by a portion flaring outwardly to a diameter greater than that of said head, said hole being surrounded by a wall provided with a groove and having a diameter greater than the external diameter of the tube, which consists in holding the end of the tube in said hole, progressively forcing the head of the tool into the tube thereby locally expanding the metal of the tube as the movement of the tool progresses, and then forcing said flaring portion of the tool into the extreme end of the tube thereby flaring it outwardly to a diameter greater than that of the hole.

GEORGE J. HARTNETT.